United States Patent
Eisenmann et al.

(10) Patent No.: US 12,498,358 B2
(45) Date of Patent: Dec. 16, 2025

(54) BRACELET TO TEST FOR KNOCK-OUT DROPS

(71) Applicant: Twinvay GmbH, Waldbronn (DE)

(72) Inventors: Kim Eisenmann, Karlsruhe (DE); Sven Häuser, Karlsruhe (DE)

(73) Assignee: Twinvay GmbH, Waldbronn (DE)

( * ) Notice: Subject to any disclaimer, the term of this patent is extended or adjusted under 35 U.S.C. 154(b) by 794 days.

(21) Appl. No.: 17/754,494

(22) PCT Filed: Oct. 2, 2020

(86) PCT No.: PCT/EP2020/077657
§ 371 (c)(1),
(2) Date: Apr. 4, 2022

(87) PCT Pub. No.: WO2021/064172
PCT Pub. Date: Apr. 8, 2021

(65) Prior Publication Data
US 2024/0053310 A1    Feb. 15, 2024

(30) Foreign Application Priority Data
Oct. 2, 2019 (DE) .................. 20 2019 105 456.5

(51) Int. Cl.
*G01N 31/22* (2006.01)
*G01N 21/77* (2006.01)
*G01N 21/78* (2006.01)

(52) U.S. Cl.
CPC ............. *G01N 31/22* (2013.01); *G01N 21/78* (2013.01); *B01L 2200/16* (2013.01); *G01N 2021/7759* (2013.01); *G01N 2021/7793* (2013.01)

(58) Field of Classification Search
CPC ................... G01N 31/22; G01N 21/78; G01N 2021/7759; G01N 2021/7793; G01N 33/14; B01L 2200/16; A44C 5/0015
See application file for complete search history.

(56) References Cited

U.S. PATENT DOCUMENTS 6,153,147 A * 11/2000 Craig ................. G01N 33/94
                                                              422/939
2003/0224474 A1* 12/2003 Litman .................. C12Q 1/28
                                                              435/28

(Continued)

FOREIGN PATENT DOCUMENTS

JP        2018141711 A       9/2018

OTHER PUBLICATIONS

Tanja Rastatter: "Ein Armband für den Kampf gegen K.o.-Tropfen", Badische Neueste Nachrichten, Mar. 20, 2019 (Mar. 20, 2019), pp. 1-5, XP055770514, retrieved from the Internet: URL:https://bnn.de/karlsruhe/einarmband-fuer-den-kampf-gegen-k-o-tropfen (Year: 2019).*

(Continued)

*Primary Examiner* — Jennifer Wecker
*Assistant Examiner* — Britney N. Washington
(74) *Attorney, Agent, or Firm* — Price Heneveld LLP

(57) ABSTRACT

A bracelet includes a band formed with or from a test strip that includes at least one field with dried chemical substance. The dried chemical substance has a first color tone, and the bracelet is configured to indicate the presence of K.O. drops by the addition of liquid to the at least one field having the dried chemical substance.

18 Claims, 1 Drawing Sheet

(56) References Cited

U.S. PATENT DOCUMENTS

2010/0240134 A1* 9/2010 Liner .................... G01N 31/22
    422/423
2016/0349185 A1* 12/2016 Park .................. G01N 21/8483
2017/0209313 A1* 7/2017 Letourneau .......... G01N 33/525

OTHER PUBLICATIONS

Tanja Rastatter; "Ein Armband fur den Kampf gegen K.o.-Tropfen" Badische Neueste Nachrichten; Mar. 20, 2019 (Mar. 20, 2019); pp. 1-5, Retrieved from the Internet: https://bnn.de/karlsruhe/ein-armband-fuer-den-kampf-gegen-k-o-tropfen; XP055770514 (whole document).

Ulrich Schreiber; "Trligerische Sicherheit: GHB-Schnellte t soll vor K.0.-Tropfen warnen"; Deutsche Apotheker Zeitung; vol. 22, May 30, 2019 (May 30, 2019); pp. 40-42; ISSN: 0011-9857; XP055770240 (whole document).

Dale W. Quest et al.; "Field-Test of a Date-Rape Dmg Detection Device"; Journal of Analytical Toxicology,;vol. 31, No. 6, Jul. 2007 (Jul. 2007); pp. 354-357; DOI: 10.1093/jat/31.6.354; ISSN: 0146-4760; XP055770339.

* cited by examiner

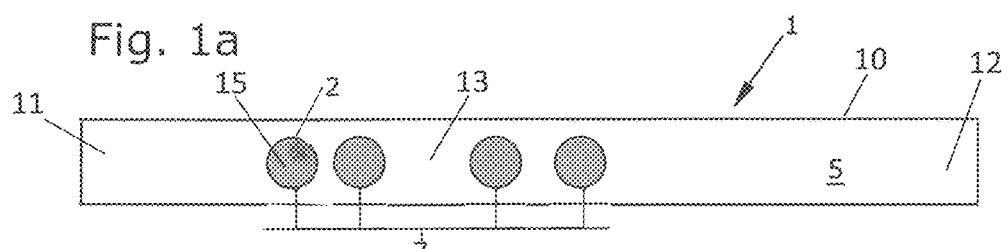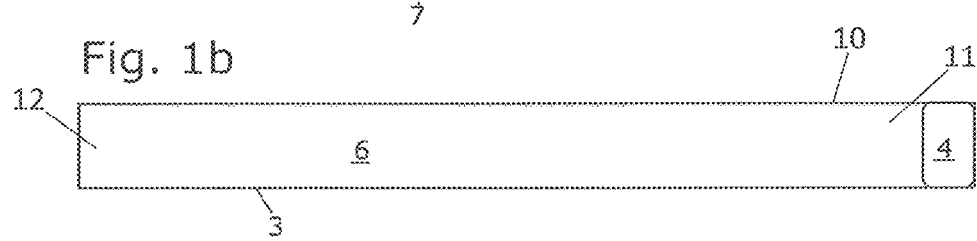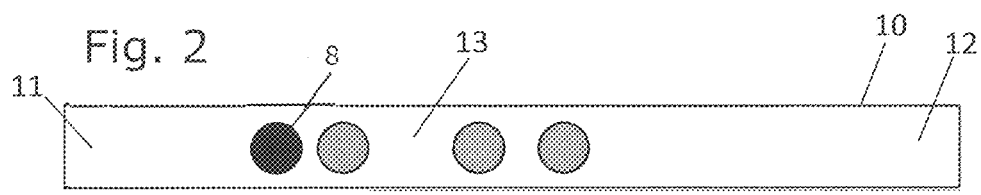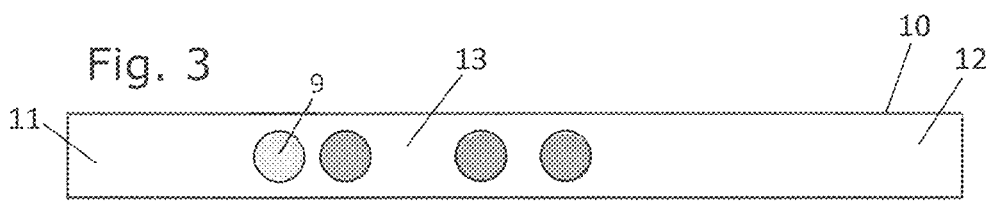

BRACELET TO TEST FOR KNOCK-OUT DROPS

BACKGROUND OF THE INVENTION

The invention relates to a bracelet made with or from a test strip, with which a drink can be tested for KO drops.

KO drops are not only a risk to health but also pose a high risk in social terms.

The ingestion of KO drops, such as e.g. gamma hydroxybutyric acid (GHB) leads in most cases to a loss of control over one's own body, tiredness, gaps in memory and defencelessness. An overdose can lead not only to symptoms of poisoning but to respiratory depression and therefore to death.

Generally speaking, these KO drops are mixed into a drink unnoticed by victims in order to render them helpless and incapable of action. The victim frequently becomes the object of a crime such as bodily harm, robbery, rape or other abuse.

For these reasons, KO drops pose a high risk in social terms. The police are powerless, the perpetrators cannot be caught and thus far potential victims have not had the option of testing a contaminated drink before consuming it.

Bracelets for use as jewelry or for fastening a watch case to the wrist are known. Test strips are used in laboratories to check the effects of certain substances. This is frequently indicated by indicator coloring at a correspondingly designated point on the test strip.

A disadvantage is that jewelry or watch bracelets are not equipped to test liquids for their constituents.

Proceeding from the above-mentioned prior art, the object of the invention is to create a bracelet made with or from a test strip which is provided with simple means to be able to detect KO drops reliably and quickly.

SUMMARY OF THE INVENTION

In one embodiment as shown and described herein, a bracelet may include a band with two opposing ends configured to be fastened to each other, a front side and a rear side, wherein the band is formed with or from a test strip that includes at least one field, preferably four fields, with a dried chemical substance, which has/have a first color tone to test for KO drops by the addition of a test liquid to the at least one field.

BRIEF DESCRIPTION OF THE DRAWINGS

FIG. 1a is a schematic top plan view of a bracelet embodying the present invention;

FIG. 1b is a schematic bottom plan view of the bracelet;

FIG. 2 is a schematic top plan view of the bracelet with a test zone comprising a first color tone; and FIG. 3 is a schematic top plan view of the bracelet with the test zone comprising a second color tone.

DETAILED DESCRIPTION OF THE PREFERRED EMBODIMENTS

According to the invention, a bracelet 1 (FIGS. 1a-3) comprises a band 10 with two opposing ends 11, 12 which can be fastened to each other, which band 10 comprises a front and rear side 5, 6. This band 10 is either formed, in particular fitted or provided, with a test strip 13 or is formed from a test strip itself. The test strip 13 comprises at least one field 2 or test field 7 which is suitable for testing for knock-out (KO) drops by the addition of a liquid to the field.

A bracelet 1 made with or from a test strip 13 can contribute to a higher level of safety. Since the demand for greater safety is high, economic use and the generation of turnover can be assumed.

A chemical substance is applied to the test field 2, 7 of the bracelet 1 or of the test strip 13.

This chemical substance 14 is dried and visible as a colored spot of a first color tone 15 (FIG. 1a) or starting color tone on the test field 2, 7 of the bracelet 1 of test strip 13. If one wishes to test a drink for KO drops, one places a small amount of the liquid from the drink onto the at least one test field 2, 7 and waits. If the color of the test field 2, 7 discolors to a second color tone 8 (FIG. 2) compared with the starting color or starting color tone in its normal state, then KO drops are present in the liquid and therefore in the drink, from which the liquid comes. This is a case of a positive result. Depending on the drink, the reaction time can vary from a few seconds to a few minutes.

The application of the liquid to be tested to the test field 2, 7 can be carried out using a finger, e.g. an index finger, wet with the liquid to transfer the liquid to the test field 2, 7.

The bracelet 1 formed with or from the test strip is 13 preferably designed in such a way that when KO drops are not present in the tested liquid, i.e. the liquid applied to the test field 2, 7, there is a color change to a third color tone (FIG. 3) different to that when KO drops are present in the liquid. Accordingly, in the case of a negative result, the test field 2, 7 is colored in each case into a third color which is different to the test field in the original state, i.e. in the normal state with the first color tone 15. An advantage for the bracelet wearer is that they can already see that the test field 2, 7 has been used. This is also advantageous in particular when the wearer with the bracelet 1 is washing their hands and water droplets inadvertently come into contact with the test field. The chemical substance on the test field 2, 7 also then brings about a reaction which leads to the third color tone 9. The wearer will thus not erroneously reuse the same test field to test for KO drops. In particular, they will not use the used test field to test for KO drops. Any color tones can be used but all color tones, i.e. the first, second and third, as well as a fourth color tone described below, are always different to each other as soon as they appear on a test strip. Positive and negative results are always in different color tones, wherein nuances within the respective color tone range are acceptable.

The band 10 of the bracelet 1 can be formed from a one-piece material. It then preferably has at least one first opening which is provided as a viewing opening, through which the result of the test field can be seen. In a particularly preferred embodiment, two openings are formed on the band. The test strip or the test portion or alternatively even only a test field 2, 7 can be inserted into or withdrawn through a second opening. Furthermore, the first opening is formed as a viewing opening, preferably as a circular, oval, rectangular or triangular viewing opening. The test field 2, 7 can be seen and the positive or a negative result can then be read through this viewing opening. The at least one insertion/withdrawal opening is preferably provided at one end of the bracelet in the region of the closure device. However, it is alternatively also possible to provide this insertion/withdrawal opening on the side of the bracelet facing away from the wrist. The viewing opening is preferably disposed on the side of the closed bracelet facing away from the wrist so that the test result can be seen, like a watch case with the dial in conventional use.

In one particular embodiment of the present invention, any number of test fields can be provided on the bracelet formed with or from a test strip. Four test fields 2, 7 are preferably formed. An advantage of this is that not just one test but a plurality of tests can be carried out with the bracelet.

The bracelet is expediently formed from materials such as paper, Tyvek, silicone, synthetic material, natural fibres or leather. The use of materials such as e.g. cotton wool or wood is also particularly preferred.

In a particularly preferred embodiment, the band 10 is formed from silicone, particularly preferably as one piece with the corresponding opening(s).

The band 10 is advantageously formed from two layers of material. A test strip 13 is laid between two layers of these materials, wherein at least one first opening is provided on the outer layer, i.e. the layer remote from the wrist, in order to expose the test field 2, 7. This is preferably circular. In this case, the test strip 13 is expediently formed from paper or Tyvek. After use of the first test strip, a new test strip can preferably be newly inserted between the two material layers via an end-face second opening so that the bracelet can be continually reused. This is effected by simply exchanging the used test strip for a new test strip.

KO drops are understood within the present invention to be substances which have a narcotising effect. Amongst others, these include e.g. gamma hydroxybutyric acid (GHB), gamma butyrolactone (GBL), ketamine, as well as substances such as flunitrazepam, alprazolam and diazepam from the group of benzodiazepines.

In the case of liquids such as beer or apple juice, the test field preferably reacts in such a way that it colors to the third color tone when KO drops are not present. However, liquids such as red wine are exceptions. Red wine has strong color pigments which lead to discoloration of the test field and do so to such an extent that the edge of the test field becomes red. This poses the question of how to distinguish between the presence of KO drops and the absence of KO drops in the color tone. The problem is solved in that in the case of such an exception, the second color tone is still clearly visible or discernible in the case where KO drops are present.

In a particularly preferred embodiment, the bracelet 1 is provided with a glued means, by which it can be closed. At one end of the rear side, the bracelet 1 preferably has a glued surface 4 for closing the bracelet 1 with an adhesion surface on the opposite end of the front side. The glued surface 4 is thus located at a first end 11 of the rear side 6 and the adhesion surface at a second end 12 of the front side 5. As soon as the bracelet 1 is placed around the wrist, one end of the rear side 6 with the glued surface 4 can be placed against the adhesion surface of the front side 5. Secure closure of the bracelet 1 is thus achieved. Alternatively, a hook-and-loop closure or buckle closure can also be provided so as to ensure that the bracelet 1 can be reused over a relatively long period of time.

Advantageously, in the case of a two-layer bracelet version, in which a test strip can be pushed in between the two material layers connected to each other preferably laterally and firmly at a first end, e.g. by a seam, the opening for pushing in the test strip and for withdrawal is located at a second end of the front side.

The invention claimed is:

1. A wearable test strip bracelet for a human wrist, comprising:
   a band, wherein the band comprises:
   two opposing ends configured to be fastened to each other via a closure mechanism, wherein the closure mechanism is configured to secure the bracelet around a human wrist;
   a front side comprising an outer wrist material layer, wherein the front side is configured to face directionally away from the human wrist when fastened;
   a rear side comprising an inner wrist material layer, wherein the wrist side is configured to face directionally towards the human wrist when fastened;
   a test portion side comprising a test portion slot, wherein the test portion slot is configured to be between and parallel to the outer wrist material layer and the inner wrist material layer when fastened to the human wrist;
   a disposable and removeable test strip base;
   a plurality of fields, wherein the plurality of fields are configured to be disposed on the test strip base and each field comprises a dried chemical substance, wherein the dried chemical substance is configured to discolor into a first color tone and a second color tone in response to contact with a knock-out drug, and wherein the knock-out drug comprises at least one of Gamma-Hydroxybutyrate, Ketamine, Rohypnol, Flunitrazepam, Alprazolam and Diazepam;
   a test field portion comprising the disposable and removeable test strip base and the plurality of fields, wherein the test field portion is configured to fit into the test portion slot;
   a normal state color tone comprising the first color tone, wherein the first color tone of the dried chemical substance is configured to be dry and visible before starting a test for the presence of a knock-out drug within a sample of a fluid;
   a positive state color tone comprising the second color tone, wherein the second color tone is different from the first color tone, wherein an application of the sample of the fluid to at least one of the fields of the plurality of fields causes the dried chemical substance to turn into the second color tone if the sample of the fluid contains the knock-out drug;
   a first opening, wherein the first opening is a viewing opening configured to be disposed on the front side of the band and to visually display the test field portion; and
   a second opening, wherein the second opening is a test portion opening configured to be disposed on the test portion side of the band and to allow the insertion and withdrawal of the test strip base from the test portion slot.

2. The bracelet as claimed in claim 1, wherein the plurality of fields includes four fields.

3. The bracelet as claimed in claim 1, wherein the two material layers are connected to each other laterally at a first end by a seam that includes the plurality of fields.

4. The bracelet as claimed in claim 3, wherein the first color tone corresponds to a color tone of a test strip base housed in the band.

5. The bracelet as claimed in claim 1, wherein the first opening is circular, rectangular, or triangular.

6. The bracelet as claimed in claim 1, wherein the plurality of fields are configured to be discolored to a third color tone when the knock-out drug is not present in the test liquid.

7. The bracelet as claimed claim 6, wherein the pluarality of fields are configured to be discolored to a fourth color tone when, in the case where the knock-out drug is absent, a colour pigment is present in the sample of the liquid.

8. The bracelet as claimed in claim 1, wherein the bracelet comprises at least one material including paper, Tyvek, silicone, synthetic material, natural fibres or leather.

9. The bracelet as claimed in claim 1, wherein the closure mechanism comprises a glued surface at one end of the rear side, and an adhesion surface at the opposing end of the front side such that the bracelet is configured to be closed via a firm adhesive bond over the surfaces.

10. The bracelet as claimed in claim 1, wherein the surfaces of the front side and rear side are configured to be printed.

11. A method for detecting the presence of the knock-out drug, comprising:
   providing the bracelet of claim 1;
   fastening the bracelet about a human wrist via the closure mechanism;
   obtaining the sample of the fluid from a container via the applicator;
   applying the sample of the fluid to at least one of the fields of the plurality of fields via the applicator; and
   detecting the presence of the knock-out drug within the sample by observing a change of the first color tone to the second color tone if the knock-out drug is present in the sample of the fluid.

12. A method for detecting the presence of a knock-out drug, comprising:
   providing a wearable test strip bracelet for a human wrist, comprising:
   a band that comprises:
   two opposing ends;
   a closure mechanism configured to fasten the two opposing ends to one another and secure the band about a human wrist; and
   a front side comprising an outer wrist material layer, wherein the front side is configured to face directionally away from the human wrist when fastened; and
   a rear side comprising an inner wrist material layer, wherein the wrist side is configured to face directionally towards the human wrist when fastened;
   a test portion side comprising a test portion slot, wherein the test portion slot is configured to be between and parallel to the outer wrist material layer and the inner wrist material layer when fastened to the human wrist;
   a disposable and removeable test strip base;
   a plurality of fields, wherein the plurality of fields are configured to be disposed on the test strip base and each field comprises a dried chemical substance, wherein the dried chemical substance is configured to discolor into a first color tone and a second color tone in response to contact with a knock-out drug, and wherein the knock-out drug comprises at least one of Gamma-Hydroxybutyrate, Ketamine, Rohypnol, Flunitrazepam, Alprazolam and Diazepam;
   a test field portion comprising the disposable and removeable test strip base and the plurality of fields, wherein the test field portion is configured to fit into the test portion slot;
   a normal state color tone comprising the first color tone, wherein the first color tone of the dried chemical substance is configured to be dry and visible before starting a test for the presence of a knock-out drug within a sample of a fluid;
   a positive state color tone comprising the second color tone, wherein the second color tone is different from the first color tone, wherein an application of the sample of the fluid to at least one of the fields of the plurality of fields causes the dried chemical substance to turn into the second color tone if the sample of the fluid contains the knock-out drug;
   a first opening, wherein the first opening is a viewing opening configured to be disposed on the front side of the band and to visually display the test field portion; and
   a second opening, wherein the second opening is a test portion opening configured to be disposed on the test portion side of the band and to allow the insertion and withdrawal of the test strip base from the test portion slot;
   fastening the bracelet around a human wrist via the closure mechanism;
   obtaining a sample of fluid from a container via an applicator;
   applying the sample of the fluid to the at least one detection spot via the applicator; and
   detecting the presence or absence of a knock-out drug within the sample of the fluid by observing a change of color tone of the at least one detection spot, wherein a second color tone of the at least detection spot indicates the presence of the knock-out drug in the sample of the fluid, and a third color tone of the at least one detection spot indicates the absence of the knock-out drug in the sample of the fluid.

13. The method of claim 12, wherein the third color tone is different that the first color tone.

14. The method of claim 12, wherein the at least one color detection spot includes two different color detection spots.

15. The method of claim 12, wherein the knock-out drug comprises at least one of Gamma-Hydroxybutyrate, Ketamine, Rohypnol, Flunitrazepam, Alprazolam and Diazepam.

16. The method of claim 12, wherein the applicator includes a straw.

17. A method for detecting the presence of a knock-out drug, comprising:
   providing a wearable test strip bracelet for a human wrist, comprising:
   a band comprising:
   two opposing ends;
   a closure mechanism configured to fasten the two opposing ends to one another and secure the band about a human wrist; and
   a front side comprising an outer wrist material layer, wherein the front side is configured to face directionally away from the human wrist when fastened; and
   a rear side comprising an inner wrist material layer, wherein the wrist side is configured to face directionally towards the human wrist when fastened;
   a test portion side comprising a test portion slot, wherein the test portion slot is configured to be between and parallel to the outer wrist material layer and the inner wrist material layer when fastened to the human wrist;
   a disposable and removeable test strip base;
   a plurality of fields, wherein the plurality of fields are configured to be disposed on the test strip base and each field comprises a dried chemical substance, wherein the dried chemical substance is configured to discolor into a first color tone and a second color tone in response to contact with a knock-out drug, and wherein the knock-out drug comprises at least one of Gamma-Hydroxybutyrate, Ketamine, Rohypnol, Flunitrazepam, Alprazolam and Diazepam;

a test field portion comprising the disposable and removeable test strip base and the plurality of fields, wherein the test field portion is configured to fit into the test portion slot;

a normal state color tone comprising the first color tone, wherein the first color tone of the dried chemical substance is configured to be dry and visible before starting a test for the presence of a knock-out drug within a sample of a fluid;

a positive state color tone comprising the second color tone, wherein the second color tone is different from the first color tone, wherein an application of the sample of the fluid to at least one of the fields of the plurality of fields causes the dried chemical substance to turn into the second color tone if the sample of the fluid contains the knock- out drug;

a first opening, wherein the first opening is a viewing opening configured to be disposed on the front side of the band and to visually display the test field portion; and a second opening, wherein the second opening is a test portion opening configured to be disposed on the test portion side of the band and to allow the insertion and withdrawal of the test strip base from the test portion slot;

fastening the bracelet around a human wrist via the closure mechanism;

obtaining a sample of fluid from a container via an applicator;

applying the sample of the fluid to at least one detection spot of the at least two detection spots via the applicator; and detecting the presence or absence of a knock-out drug within the sample of the fluid by observing a change of color tone of the at least one detection spot, wherein a second color tone of the at least detection spot indicates the presence of the knock-out drug in the sample of the fluid, and a third color tone of the at least one detection spot indicates the absence of the knock- out drug in the sample of the fluid;

wherein the third color tone is different than the first color tone;

wherein the knock-out drug comprises at least one of Gamma-Hydroxybutyrate, Ketamine, Rohypnol, Flunitrazepam, Alprazolam and Diazepam.

18. The bracelet as claimed in claim 3, wherein the seam is waterproof.

* * * * *